United States Patent [19]

Allen

[11] Patent Number: 4,952,937

[45] Date of Patent: Aug. 28, 1990

[54] REMOTELY MOUNTED POLICE RADAR WARNING RECEIVER

[75] Inventor: Paul M. Allen, Cincinnati, Ohio

[73] Assignee: Cincinnati Microwave, Inc., Cincinnati, Ohio

[21] Appl. No.: 434,426

[22] Filed: Nov. 13, 1989

[51] Int. Cl.$^5$ .............................................. G01S 7/40
[52] U.S. Cl. ..................................... 342/20; 455/345; 455/353; 455/347
[58] Field of Search ....................... 342/20, 70, 73, 89; 455/345, 346, 347, 353

[56] References Cited

U.S. PATENT DOCUMENTS

| | | | |
|---|---|---|---|
| Re. 28,302 | 1/1975 | Staras et al. | 342/159 |
| 2,841,782 | 7/1958 | McIlwain | 342/71 |
| 3,120,640 | 2/1964 | Midlock et al. | 455/90 |
| 3,683,379 | 8/1972 | Saddler et al. | 342/71 |
| 3,781,879 | 12/1973 | Staras et al. | 342/159 |
| 3,794,997 | 2/1974 | Iwatsuki et al. | 342/72 |
| 4,001,822 | 1/1977 | Sterzer | 342/44 |
| 4,182,990 | 1/1980 | Coffin et al. | 325/364 |
| 4,210,357 | 7/1980 | Adachi | 342/70 |
| 4,293,859 | 10/1981 | Sergent | 342/104 X |
| 4,318,103 | 3/1982 | Roettele et al. | 342/20 |
| 4,346,774 | 8/1982 | Hirota et al. | 342/71 X |
| 4,373,161 | 2/1983 | Matsumura | 343/717 |
| 4,625,210 | 11/1986 | Sagl | 342/20 |
| 4,632,543 | 12/1986 | Endo | 356/5 |
| 4,633,521 | 12/1986 | Liautaud | 455/345 |
| 4,725,840 | 2/1988 | Orazietti | 342/20 |
| 4,760,497 | 7/1988 | Roston | 361/427 |
| 4,791,420 | 12/1988 | Baba | 342/20 |
| 4,801,938 | 1/1989 | Holmes | 342/20 |
| 4,818,997 | 4/1989 | Holmes | |

OTHER PUBLICATIONS

Shefer, J., Klensch, R. J., "Harmonic Radar Helps Autos Avoid Collisions", RCA Laboratories, IEEE Spectrum, May 1973.
Csere, Csaba, Sherman, Don, "Find the Hidden Radar Detector", Car and Driver, Mar. 1985.

Primary Examiner—Thomas H. Tarcza
Assistant Examiner—John B. Sotomayor
Attorney, Agent, or Firm—Wood, Herron & Evans

[57] ABSTRACT

A remotely mounted radar detector is mounted vertically behind a license plate with a reflector attached to the horn at an angle such that the reflector extends beyond one edge of the license plate to reflect incoming, horizontal radar signals into a vertically oriented plane and to the horn antenna. Preferably, a bracket snugly secures the license plate to the one end of the vehicle, with the radar detector sandwiched therebetween and facing downwardly. The bottom portion of the bracket has a horizontal lip spaced from the bottom edge of the license plate so as not to obstruct incoming radar signals that pass therebetween enroute to the reflector. The bottom portion also has a vertical lip with a window, thereby to substantially hide the reflector from view and at the same time to permit passage therethrough of radar signals to the reflector.

16 Claims, 1 Drawing Sheet

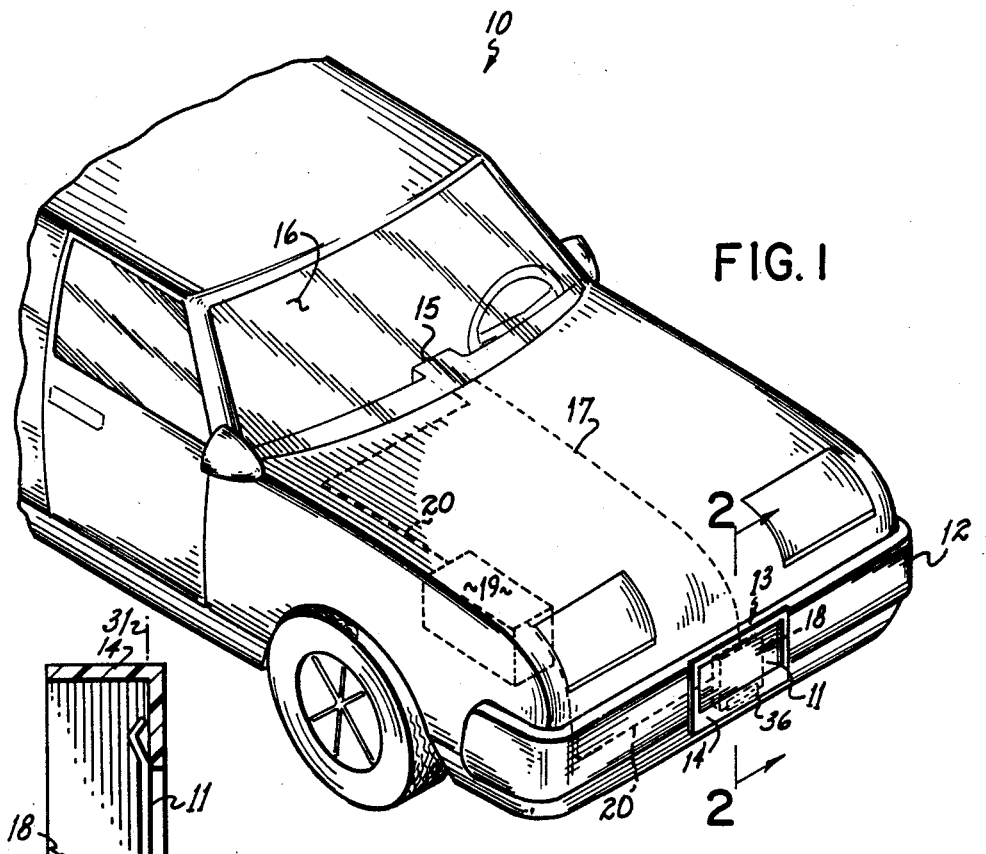
FIG. 1
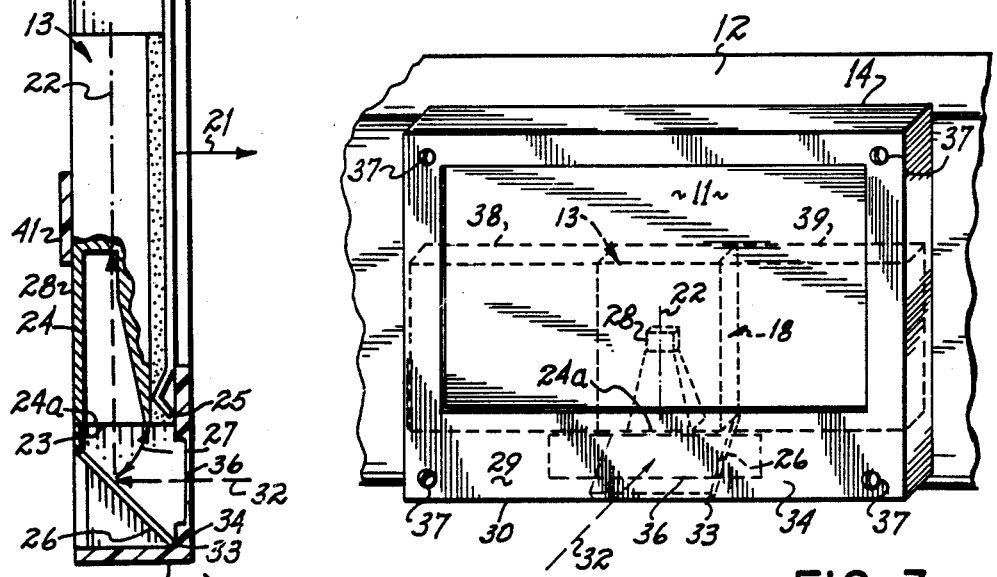
FIG. 2
FIG. 3

4,952,937

REMOTELY MOUNTED POLICE RADAR WARNING RECEIVER

FIELD OF THE INVENTION

This invention relates to a remotely mounted police radar warning receiver for use in a vehicle, and more particularly to a remotely mounted radar warning receiver having certain components thereof concealed behind a license plate and its associated holder at one end of the vehicle.

BACKGROUND OF THE INVENTION

A police radar warning receiver employed in a motor vehicle provides visible and/or audible warnings when the vehicle is under police radar surveillance for possible speeding violations. A conventional radar receiver includes an antenna that receives incoming radar signals, internal circuitry that processes the received signals, and a visible light and/or audible alarm that indicates to the vehicle operator when police radar has been detected. Typically, these components of the radar receiver are located within a single housing mounted in the interior of the vehicle. Electrical power is supplied to the police radar receiver via a plug that can be inserted into the cigarette lighter receptacle of the vehicle.

To optimize the reception capability of the radar receiver antenna, such units may be mounted to the windshield as by suction cups, or clipped to the sun visor in a manner which provides an unobstructed signal path through the windshield to the antenna. However, for various reasons, mounting the radar receiver in this manner presents a number of disadvantages related to reception, convenience and theft prevention.

Firstly, under some conditions the windshield of a vehicle may be opaque to radar signals and adversely affect reception. For instance, when the exterior surface of the windshield is covered with ice or snow or not yet completely defrosted, transmission of radar through the windshield to the antenna can be impaired.

Moreover, some vehicles have windshields that incorporate transparent metallic coatings. These coatings are used to reduce solar heat gain within the vehicle, or to quickly de-ice the windshield (by using the resistive properties of the metallic film to heat the windshield by applying electrical power to the coating). Radar signals are greatly reduced or eliminated by these metallic coatings, and as such a radar detector mounted within a vehicle with such a windshield coating would have significantly reduced performance.

Secondly, a windshield mounted radar receiver and the electrical connecting cord extending from the cigarette lighter to a radar receiver may partially block or impair the driver's view through the windshield, or at the very least distract the driver.

Thirdly, mounting of the radar receiver adjacent the windshield places the device in full view of passersby and thus increases the risk of theft when the vehicle is parked. While the radar receiver can be disconnected from the cigarette lighter and removed from view prior to when the vehicle is left unattended, this is inconvenient to the driver.

For these and other reasons, "remote" radar receivers, or more precisely, radar receivers having their antennas mounted remote relative to the inside of the vehicle whereat the audible/visual alarm section is located, have become increasingly more popular. In "remote" radar receivers, the antenna portion of the receiver, which is mounted remotely from the separate audible/visual warning unit located in the interior of the vehicle, detects incoming radar signals. The received radar is then processed by the signal processing section, which is mounted proximate to the antenna. Following signal processing, a suitable warning signal is transmitted to the audible/visual warning section to provide the vehicle operator with an audible/visual warning that police radar has been received. Because the internally located warning section does not need to be mounted in such a manner as to receive signals through the windshield, and also because the antenna and processing circuitry are located remotely, the warning section can be reduced in size and easily mounted to, or under, the dashboard. This reduction in size promotes convenience in use and reduces the risk of theft. Aside from the fact that the smaller internal unit is more difficult to see from the outside of a vehicle, there is also reduced incentive for theft because the interior warning section will not work without the remote unit mounted inaccessibly under the hood.

Unfortunately, the advantages of increased convenience and reduced risk of theft come at the expense of optimum reception. For concealment reasons, the antenna section is typically mounted under the hood of the vehicle, and is aimed in a forward direction through the grill of the vehicle. Unfortunately, due to the different front end configurations of various types of vehicles, it may be extremely difficult to find a suitable location under the hood for mounting the remote antenna unit in a manner that aims the antenna down the road toward oncoming police radar signals. Even after the remote unit is mounted, the presence of electrically conductive grillwork in front of the antenna may interfere with optimum radar signal reception by the antenna.

It is thus an object of this invention to provide remote mounting of the antenna of a police radar warning receiver in a convenient manner which optimizes antenna concealment without sacrificing reception capability.

SUMMARY OF THE INVENTION

This invention contemplates the remote, concealed mounting of the antenna section of a police radar warning receiver by means of (a) placement of the antenna section behind the license plate of a vehicle, with the axis of the throat of the antenna of the detector being located in a vertical plane with the mouth thereof adjacent one edge of the license plate, and (b) provision of a radar reflector attached to the antenna at a 45° angle to the axis of the throat thereof and extending laterally beyond the edge of the license plate in order to reflect oncoming horizontally directed radar signals into a vertical plane along the axis of the throat of the antenna.

To these ends, in accordance with a preferred embodiment of the invention, the remotely mounted section of the radar receiver containing the antenna is located behind the license plate which is mounted vertically at the front end of the vehicle. The radar detector is disposed vertically, with the horn antenna facing downward and its mouth about even with the bottom edge of the license plate. In this position the axis of the horn antenna throat is parallel to the vertical side edges of the license plate. A radar reflector mounted immediately below the lower horizontal edge of the license plate below and proximate the mouth of the antenna horn is angled rearwardly and upwardly at a 45° angle to the axis of the horn antenna to direct horizontally travelling radar vertically upwardly into the mouth of the horn antenna. A rectangular bracket is secured to the vehicle and snugly engages the top and opposite side marginal edge areas of the license plate. The bottom portion of the rectangular bracket has a horizontally disposed and rearwardly extending lip spaced from the bottom edge of the license plate and a vertically disposed lip extending above and below the bottom edge of the license plate. The horizontally disposed lip supports the unattached, forward end of the radar reflector while the vertically disposed lip substantially conceals the reflector. The vertically disposed lip has a transparent section or window that enables horizontally oriented signals aimed at the vehicle to pass through to the reflector, whereupon the signals are reflected upwardly into the vertically disposed horn antenna. Suitable connecting cables extending from the remotely mounted antenna unit to an interiorly mounted unit convey reception of the incoming police radar signals. The interiorly mounted unit provides an audible and/or visible warning upon receipt of incoming police radar warning signals.

Mounting of the radar detector behind the license plate places it out of view from observers, yet provides unobstructed reception of incoming police radar signals. Because all vehicles are required to bear standard size license plates, versatility in mounting is achieved in a manner which provides optimum concealment.

To mount a remote radar warning receiver in accordance with a preferred embodiment of the invention, a reflector is fixedly secured to the antenna housing proximate the horn antenna mouth, at a 45° angle relative thereto. The antenna housing is then held in place on a centered position at the location where the license plate is to be secured, with the lower end or mouth of the antenna located even with or in about the same horizontal plane that is to be occupied by the bottom edge of the license plate. This locates the reflector below the plane of the lower license plate edge. The antenna faces downwardly to prevent particle accumulation therein. With the license plate held in place over the antenna housing, the rectangular license plate bracket is placed over the license plate to snugly engage all but the bottom edge, and then is secured to the vehicle by screws. Tightening of the screws holds the antenna housing in place between the vehicle body and the license plate, while the horizontal bracket lip also supports the unattached edge of the reflector. If desired, the antenna housing may be sandwiched on its sides between pads or locators, so that tightening of the bracket screws does not deform the license plate.

Alternately, the antenna housing of the radar receiver may be mechanically fastened to the vehicle body in the appropriate location, or secured to the back of the license plate prior to mounting of the license plate bracket.

These and other features of the invention will be more readily understood in view of the following detailed description and the drawings in which:

BRIEF DESCRIPTION OF THE DRAWINGS

FIG. 1 is a perspective view of the antenna section of a radar warning receiver mounted remotely from the interior of a vehicle in accordance with a preferred embodiment of the invention;

FIG. 2 is a cross-sectional view taken along lines 2—2 of FIG. 1; and

FIG. 3 is an enlarged front view of the antenna section of a radar warning receiver mounted remotely in accordance with the preferred embodiment of the invention.

DETAILED DESCRIPTION OF THE DRAWINGS

FIG. 1 shows a vehicle 10 having a vertically disposed rectangular license plate 11 mounted at the front end 12 thereof. An antenna housing 13 of a radar warning receiver is mounted behind the license plate 11 so as to be concealed from view. The license plate 11 is held in place by a rectangular license plate frame or bracket 14 attached to the vehicle 10. It is to be understood that the antenna housing 13 could also be mounted to a rearwardly facing license plate at the back end of the vehicle 10. In either case, as the term is used herein, the word "behind" is with respect to the license plate 11. In other words, "behind" refers to the interior or back of the license plate, as opposed to the exterior or front of the license plate 11. A warning section or unit 15 of the radar warning receiver mounted within the interior 16 of the vehicle 10 receives electrical signals from the antenna section or unit 13 via a cable 17, which may be routed therebetween in any convenient manner. Power to both the antenna unit 13 and the warning unit 15 is supplied by the battery 19 of the vehicle 10 through power lines 20, which are also conveniently routed between the vehicle battery 19 and the respective units. Power to the remote antenna unit 13 may be turned on by a switch (not shown) in the vehicle 10, or perhaps by a remotely located motion sensor or electrical noise detector.

As shown in FIG. 2, the registration numbers (not shown) of the license plate 11 face in an outward or forward direction, as indicated by directional arrow 21. A receiving end 23 of the antenna unit 13 includes a downwardly opening horn 24. The mouth 24a of the antenna horn 24 lies behind the bottom edge 25 of the license plate 11, and preferably in about the same horizontal plane, for optimum concealment. Although the mouth 24a of the horn 24 may be located behind any of the four edges of the license plate 11, as mentioned previously, it is preferably located adjacent the bottom edge 25 in order to reduce accumulation therein of dust and other particles. The remote antenna unit 13 is preferably parallel with the license plate 11 so that a central axis 22 of a throat 28 of the horn 24 is parallel with a plane 31 occupied by the license plate 11. Reflector 26 is fixedly attached to the lower receiving end 23 of the antenna housing at an angle designated by a directional arrow 27. With the license plate 11 and the antenna unit 12 mounted in parallel, vertical disposition, angle 27 will be about 45°.

The rectangular license plate bracket 14 has a first or bottom horizontal portion 29 that corresponds to bottom horizontal edge 25 of license plate 11. Bottom portion 29 has a horizontal lip 30 that lies in a plane perpendicular to the plane 31 occupied by the license plate 11. The horizontal lip 30 is spaced from bottom edge 25 so as not to block the transverse passage therebetween of horizontally rearwardly directed radar signal 32. When the bracket 14 is secured to the vehicle 10, the horizontal lip 30 extends rearwardly behind the license plate 11 and is spaced below the receiving end of antenna unit 12, preferably supporting an unattached end 33 of the reflector 26.

Bottom bracket portion 29 also has a vertical lip 34 that conceals the reflector 26 from view as well as covers the lower marginal edge area of the license plate. As shown in FIG. 3 in dashed lines, at least one section 36 of this vertical lip 34 serves as a window 36 that permits passage therethrough of the radar signal 32 to the reflector 26. Preferably, the entire bracket 14 is made out of a visually opaque, but radar-transparent ABS plastic, to maximize concealment of the reflector. The window 36 preferably has dimensions of about ¾ of an inch high by 3 inches wide. The thickness of vertical lip 34 is about ⅛", although it may be desirable to relieve or cut away some of the backside surface of the lip 34 in order to reduce this thickness at the window 36, as shown in FIG. 2.

Alternately, the bracket 14 may be of metal, or any other suitably rigid material, with window 36 being a slidable insert and formed of glass or plastic, or any material that is transparent to the radar signals transmitted by police radar.

Although shown in a central location with respect to the bracket 14, the radar detector 13, reflector 26, and the window 36 may be moved to the left or the right, so long as they remain aligned in a common transverse vertical plane that bisects the vehicle 10 longitudinally. The radar detector 13 may be mounted behind license plate 11 in any suitable manner that provides sufficient support under road conditions. However, it is preferably mounted directly behind the license plate 11, and held in place by the bracket 14, with no mechanical fasteners required. Mounting screws 37 extend through the corners of the rectangular bracket 14 and into mounting holes in the vehicle 10 aligned therewith.

This invention contemplates use of a remote antenna unit 13 that is similar in size to a radar warning receiver currently marketed by the assignee of this application under the trademark PASSPORT TM. As mentioned previously, this radar detector is about the same size as a cassette tape case. An antenna unit having these dimensions can be held behind the plate 11 so long as the mounting screws 37 for the bracket 14 are long enough. The housing 13 preferably includes the antenna 24, and at least a mixer, a local oscillator and their attendant circuitry (not shown), as described in U.S. Pat. No. 4,613,989 which is expressly incorporated by reference herein in its entirety.

For additional support, as mentioned previously, horizontal lip 30 extends rearwardly of the license plate 11 to a position beneath the unattached end 33 of the reflector 26. It may also be desirable to mechanically fasten the antenna unit 13 to either an outwardly facing portion of the vehicle 10 or to the back of the license plate 11. Alternatively, for additional support, the antenna unit 13 may also be centered between locators or spacers, 38 and 39. The spacers 38 and 39 hold the detector 13 in line with the window 36 and also more evenly distribute the force applied by tightening of the fastening screws, thereby preventing rearward bending or bowing of the license plate.

As a further alternative, the rear of the bracket 14 may be provided with an attachable strip 41 or an attachable flanged support that encircles or encloses the rear of antenna unit 13 and the spacers 38 and 39, as shown in FIG. 2, thus holding the antenna unit 13 and the plate 11 to the bracket 14 as a single unit. This single unit could then simply be mounted to the vehicle 10 by mounting screws 37 of sufficient length.

While the above description constitutes a preferred embodiment of the invention, it is to be understood that applicant does not wish to be limited thereby, and that various other embodiments would be possible without departing from the scope of the invention. Accordingly, it is to be understood that changes may be made without departing from the scope of the invention as particularly set out and claimed.

I claim:
1. A concealed antenna assembly for a remotely mounted radar warning receiver comprising:
   a license plate mounted at one end of a vehicle in substantially vertical orientation;
   a radar antenna mounted closely behind the license plate, the radar antenna having a receiving end for receiving radar signals, the receiving end located adjacent a first edge of the license plate; and
   a reflector located proximate to the receiving end of the radar antenna at an angle and extending outwardly beyond said first edge of said license plate, said reflector adapted to intercept horizontal radar signals directed toward said end of the vehicle and to reflect said signals into a vertical plane and into the receiving end of said antenna.
2. The concealed antenna assembly of claim 1 wherein the antenna has a major longitudinal axis and is oriented with said axis parallel to the license plate and said reflector extends from said receiving end at an angle of approximately 45° to the plane of the license plate.
3. The concealed antenna assembly of claim 1 and further comprising:
   a rectangular license plate bracket attachable to the vehicle in a manner to engage at least one edge of the license plate other than said first edge to hold the license plate to the vehicle when secured thereto, the bracket having a first portion corresponding to said first edge.
4. The concealed antenna assembly of claim 3 wherein the first portion further comprises:
   a lip oriented perpendicular to a plane occupied by said license plate and spaced from the first edge of the license plate, and
   a lip oriented parallel to and located outward of the first edge of the license plate and the reflector to substantially hide the reflector from view, at least a section of said parallel lip being transparent to radar to permit passage therethrough of said horizontal signals.
5. The concealed antenna assembly of claim 4 wherein said bracket is plastic.
6. The concealed antenna assembly of claim 1 wherein the first edge of the license plate is the bottom edge, the first side portion of the bracket is the lowermost part of the bracket, the receiving end of the radar antenna opens downwardly and the reflected signals are reflected upwardly into said receiving end.
7. The concealed antenna assembly of claim 6 and further comprising:
   a horizontal lip spaced from the first edge of the license plate; and
   a vertical lip located outward of the first edge of the license plate and the reflector to substantially hide the reflector from view, at least a section of said vertical lip being transparent to radar to permit passage therethrough of said horizontal signals.
8. The concealed antenna assembly of claim 7 wherein an unattached edge of the reflector extends toward said vertical lip at an angle and is supported upon said horizontal lip.

9. A concealed antenna assembly for a remotely mounted radar detector comprising:
   a license plate mounted in a vertical orientation at one end of a vehicle;
   a radar detector mounted behind the license plate in parallel relationship therewith, a receiving end of the radar detector facing downwardly and terminating adjacent a horizontal plane occupied by a bottom edge of the license plate;
   a reflector attached at a 45° angle to the receiving end of the radar detector unit, the reflector extending below said horizontal plane; and
   a rectangular bracket attachable to the vehicle to engage at least one edge of the license plate other than the bottom edge in order to secure the license plate to the vehicle, the bracket having a lower portion with a horizontal lip spaced from the bottom edge of the license plate so as to not obstruct transverse passage therebetween of horizontal radar signals enroute to the reflector for reflection into the receiving end of the radar detector.

10. The concealed antenna assembly of claim 9 wherein said lower portion of said bracket further comprises:
    a vertical lip located in front of the reflector to hide the reflector from view, the vertical lip having a radar transparent window to permit passage therethrough of said horizontal signals to said hidden reflector.

11. The concealed antenna assembly of claim 9 wherein an unattached edge of said reflector is supported on said horizontal lip.

12. The concealed antenna assembly of claim 9 and further comprises:
    mounting means for firmly attaching the bracket to the vehicle with the detector held therebetween.

13. A method of installing a radar detector on a vehicle comprising the steps of:
    providing a radar detector having a reflector attached to a receiving end thereof; and
    mounting the radar detector behind and substantially parallel with a license plate located at one end of the vehicle in a manner such that the receiving end is located proximate a first edge of the license plate and the reflector extends outwardly beyond said first edge, the reflector adapted to receive horizontal radar signals directed at said vehicle and to reflect said signals into a vertical direction toward said receiving end.

14. The method of claim 13 and further comprising the step of:
    securing the license plate to the vehicle with a bracket, the bracket having a first portion parallel to said first edge, said first portion having a horizontal lip spaced from said license plate so as not to obstruct passage therebetween of said horizontal signals enroute to said reflector, said first portion also having a vertical lip located outward of and parallel to id license plate to substantially hide the reflector from view, at least a section of the vertical lip being transparent to permit passage therethrough of said horizontal signals.

15. The method of claim 14 wherein said radar detector is mounted such that said receiving end opens downwardly.

16. The method of claim 13 wherein said providing step further comprises:
    attaching the reflector to the receiving end of the radar detector at an angle of about 45°.

* * * * *